United States Patent Office 2,822,394
Patented Feb. 4, 1958

2,822,394

RECOVERY OF CYCLOHEXANONE OXIME

Bernard H. Nicolaisen, Kenmore, and Floro F. Frulla, Schenectady, N. Y., assignors to Olin Mathieson Chemical Corporation, a corporation of Virginia No Drawing. Application August 5, 1954
Serial No. 448,140

10 Claims. (Cl. 260—566)

This invention relates to improvements in the manufacture of cyclohexanone oxime. More particularly, the present invention is concerned with a process for the recovery of cyclohexanone oxime from solution in an organic solvent.

In the manufacture of cyclohexanone oxime according to one procedure, nitrocyclohexane in its aci-nitro form is partially reduced to the oxime by means of hydrogen sulfide or other sulfides in an acid, aqueous solution. Sodium sulfide, ammonium sulfide or sodium hydrosulfide can be substituted for the hydrogen sulfide. The oxime is then recovered from the aqueous reaction medium by extraction with a suitable water-immiscible, organic solvent, usually a hydrocarbon solvent, for example, petroleum ether, hexane, heptane, toluene, benzene, or cyclohexane. A particularly advantageous process for the hydrogen sulfide reduction and extraction is described in Bernard H. Nicolaisen and James B. O'Hara application Serial No. 448,038, filed August 5, 1954.

In the sulfide reduction, considerable amounts of sulfur and sulfur compounds are formed. The free sulfur is largely in a finely divided form which is difficult to filter. In addition, organic sulfur compounds of several types appear to be formed as by-products of the reduction. Some of these sulfur compounds are relatively volatile materials and may be distilled overhead with little or no decomposition. Others of these compounds are solids which precipitate during processing in the form of filterable solids. Still others may be obtained as resinous compositions of high sulfur content. These sulfur compounds or their precursors to a large extent are extracted with the oxime from the aqueous reduction medium and are in solution with the oxime in the extracting solvent. The extract also contains cyclohexanol, cyclohexanone and unreacted nitrocyclohexane. The recovery of cyclohexanone oxime is difficult because of the numerous components present in the extract.

Solutions of the oxime in other solvents, for example, cyclohexanone and nitrocyclohexane, are suitable for use in the process of the present invention. For example, cyclohexanone oxime can be prepared by the interaction of cyclohexanone with hydroxylamine hydrochloride or sulfate in the presence of an inorganic base such as caustic or sodium carbonate. At room temperature the oxime precipitates as a solid which can be removed by filtration and, for the purposes of the present invention, taken up in a suitable solvent such as cyclohexane, petroleum ether or benzene. Alternatively, the slurry of precipitated oxime in water can be extracted with the organic solvent and the extract treated according to the process of the present invention. Solutions of sodium hydroxylamine disulfonate, prepared from sodium nitrite and sodium bisulfite, or hydroxylamine-O-sulfonic acid can be substituted for the hydroxylamine salt. Cyclohexanone oxime can also be produced by the reduction of nitrocyclohexane with zinc dust and acetic acid. The reduction mixture can be neutralized and extracted with a suitable organic solvent to produce a solution suitable for use according to the present invention. Catalytic hydrogenation of nitrocyclohexane, for example by the process of U. S. Patent 2,638,482, produces cyclohexanone oxime. In this process ammonia is used as a source of hydrogen. The reduction mixture can be evaporated and the residue taken up in benzene, cyclohexanone or unreacted nitrocyclohexane. Any of these solutions of the oxime are suitable for use according to the process of the present invention. Solutions of cyclohexanone oxime can also be obtained by extracting the hydrogenation products of nitrocyclohexane where hydrogen itself is used as the reducing agent. These hydrogenations can also be carried out in cyclohexane or other solvents to provide solutions suitable for use according to the present invention.

The separation of the cyclohexanone oxime from solution in an organic solvent in sufficiently phre condition for further use, especially for rearrangement to caprolactam, is the primary purpose of the present invention. In addition, it is advantageous to recover unreacted nitrocyclohexane in order to recycle it to the reduction step for eventual conversion to oxime. To be economical it is further desirable to recover and recycle any solvents used in the process. It is a further difficulty in the recovery of the oxime from the organic extract that in the presence of water, especially acidic solutions and especially at temperatures above 30° C. and up to 100° C., hydrolysis of oxime proceeds rapidly and yields of the product are markedly reduced. The oxime is hydrolyzed primarily to cyclohexanone and hydroxylamine which add to the difficulty of separating purified oxime.

The present invention provides a method for processing such extracts for the recovery in high yields of the oxime, substantially free from objectionable sulfur, sulfur compounds, and other by-products, and for the recovery of unreacted nitrocyclohexane for recycle. Generally, the present invention comprises transferring the oxime from the extracting solvent to an aqueous phase by treating with a dilute, aqueous, strong mineral acid to convert the oxime to a water-soluble salt of the acid with subsequent recovery of the oxime from the aqueous solution by partial neutralization of the aqueous phase with a suitable base to a pH of about 2 to 4. Oxime separates from the aqueous phase as a solid or liquid depending on the temperature and is recovered by appropriate means.

In the initial step of this process, cyclohexanone oxime in solution in a water-immiscible organic solvent is converted to a water-soluble salt by means of extraction with a dilute, aqueous, strong mineral acid. The oxime in the form of its salt dissolves in the aqueous acid and the resulting pH of the mixture is less than about 2. When the oxime produced by the sulfide reduction of nitrocyclohexane, unreacted nitrocyclohexane and part of the by-product sulfur compounds remain in the organic layer. Considerable proportions of the sulfur-containing components also dissolve in the aqueous phase; however substantial purification of the oxime is effected in this operation.

In the acid extraction any dilute, aqueous, strong mineral acid is suitable, e. g. sulfuric, hydrochloric, or phosphoric acids may be employed. Sulfuric acid is preferred because it is readily available at low cost and is effective. In addition, the resulting cyclohexanone oxime sulfate is readily soluble in water and is thoroughly extracted in a single treatment. The concentration of the mineral acid utilized can be between about 5 and 50% based upon the total weight of the water and acid. Substantially lower concentrations increase the probability of hydrolysis and lower the productive capacity of equipment. Acid having a concentration of about 10 to 20% $H_2SO_4$ is particularly advantageous in avoiding hydrolysis and in providing a relatively large amount of diluent water for heat absorption to aid in temperature control.

Following the initial acid treatment of the process of the present invention, the aqueous acid extract containing the oxime in solution as a salt is treated promptly for recovery of the oxime. The mixture is partially neutralized by the addition of ammonia to a pH of about 2 to 4. Oxime is liberated from its salt and separates from the aqueous layer. The oxime should be removed promptly from contact with the aqueous layer in order to avoid undue hydrolysis. In this step of the process most of the sulfur compounds, if present, which were extracted by the acid in the initial treatment, remain in the aqueous acid and thus the oxime is further purified in this respect. By neutralizing to a pH of about 2 to 4 and preferably about 3, the precipitation with the oxime of highly colored impurities which occurs at higher pH value is avoided. Most of the oxime is liberated from its salt and recoveries are satisfactory. The oxime is suitable for use directly for rearrangement with concentrated sulfuric acid when it is desired to convert the oxime to caprolactam.

Generally, the temperature of the reacting mixture during partial neutralization is maintained from about 20° to 100° C. When the temperature of the mixture is kept below about 60° C. the oxime usually precipitates as a solid and is suitably removed by filtration. However, it may be more convenient to maintain a somewhat higher temperature, say about 80° to 90° C. The oxime separates as a liquid at such temperatures and is suitably removed in a separator. The separation should be effected promptly since elevated temperatures may increase the rate of hydrolysis of the oxime and tend to reduce yields. Still another variation of this procedure is to neutralize at a temperature at which the solid oxime precipitates, and subsequently raise the temperature in order to separate the oxime as an oil.

In this neutralization step of the process of the present invention, the use of ammonia as the base to precipitate the free oxime has several advantages. It is low in cost and is easily introduced as gaseous or aqueous ammonia. In addition, ammonia is a weak base and liberates less heat in the neutralization than most other bases. Ammonium sulfate is more valuable as a by-product than sodium sulfate, for example. Ammonia precipitates the oxime from the aqueous solution at a pH of about 2 to 4 while avoiding precipitation of amine by-products and other highly colored products which are deleterious to the quality of the oxime. Furthermore, the precipitation of metallic impurities from the mixture is avoided by neutralization to a pH of 2 to 4. Oxime of high purity is thus obtained. Use of aqueous solutions of other alkalies including the alkali and alkaline earth metal hydroxides and carbonates is accompanied by the danger of over-alkalizing by locally high concentrations of caustic. This difficulty is largely avoided by the use of ammonia. Properly neutralized to a pH of about 2 to 4, a product of maximum purity is obtained by separating the oxime from the mixture, washing and drying the product.

To recover any remaining oxime in the aqueous layer, it is advantageously extracted with a suitable solvent, for example, cyclohexane, to recover as much oxime as possible before discarding the aqueous salt solution. The salt solution is then discharged to waste or worked up for by-product ammonium sulfate. The organic solution of oxime is suitably treated, e. g., by distillation to recover oxime which can be combined with the principal oxime product.

The organic solvent layer derived from the dilute, aqueous acid treatment is advantageously treated for the recovery of nitrocyclohexane and solvent, both of which can be recycled. Where the oxime solution is obtained by a sulfide reduction of a salt of nitrocyclohexane, the organic solution advantageously is extracted with aqueous caustic, for example, about 10% NaOH. The aqueous alkaline extract and solvent layers are then separated, for example, in a continuous separator. The alkaline extract of nitrocyclohexane is recycled and can be mixed with the sodium nitrocyclohexane solution obtained by alkaline extraction of the nitration mixture for charging to the reduction operation in the process of Bernard H. Nicolaisen and James B. O'Hara application Serial No. 448,088, filed August 5, 1954.

After separation of the alkaline extract of sodium nitrocyclohexane, the undissolved organic solvent layer is treated for the recovery of solvent and other products. It may be distilled, for example, in a distilling section which may comprise a continuous still, or one or more batch stills. Recovered solvent is advantageously utilized for the extraction of the aqueous salt solution from the oxime precipitation step or for the extraction of the purged reduction liquor of the process of application Serial No. 448,088. Residual sulfur-containing by-products may be discarded.

Where the oxime solution is obtained by the hydrogenation of a solution of nitrocyclohexane, the organic solution from the aqueous acid extraction can be recycled in whole or in part to the reduction operation. It is sometimes desirable to treat a portion of the solution or, at times, all of the solution for the separate recovery of nitrocyclohexane and solvent. The nitrocyclohexane can be extracted by caustic as described above and recovered from the caustic extract by acidification. The nitrocyclohexane and solvent can be further purified by distillation or the solution can be separated by distillation without the caustic extraction. Both the nitrocyclohexane and solvent are suitably recycled.

Specific systems for effecting the process of the present invention may take many forms but as an example it may be performed in the following manner:

The oxime, for example in cyclohexane solvent, obtained by the extraction of the product from the acid, aqueous sulfide reduction of nitrocyclohexane usually contains cyclohexanone oxime, unreduced nitrocyclohexane, by-product organic sulfur compounds, and cyclohexanone. The solution may contain about 10% of cyclohexanone oxime but this amount is not critical. The oxime solution is extracted with dilute aqueous sulfuric acid, for example, about 10% $H_2SO_4$. The operation may comprise thorough mixing and settling in a separator. Alternately, a continuous countercurrent packed extracting column may be used. The solvent, substantially free from oxime but containing other original components of the solution is separated as a supernatant layer and treated for further recovery of its components. The lower layer of aqueous acid solution of cyclohexanone oxime sulfate is separated and transferred to another vessel, suitably a mixer, into which anhydrous ammonia gas is introduced until the layer reaches a pH of about 3. The heat generated as the sulfuric acid is neutralized raises the temperature of the mixture to about 75° and the oxime precipitates as an oil. Provision should be made for the removal of excess heat by use of a jacketed kettle or heat exchanger or both. The cooled heterogeneous mixture of cyclohexanone oxime and aqueous liquor is transferred to a separator and the supernant oxime layer is removed. The separated oxime may contain minor proportions of water and salt but it is suitable without further treatment for rearrangement by contact with concentrated sulfuric acid to form caprolactam. Alternatively it may be dried, distilled or otherwise further treated when the oxime is desired as a pure product.

The aqueous salt solution separated from the neutralization operation may contain minor proportions of entrained or dissolved cyclohexanone oxime. It is advantageous therefore to extract the aqueous salt solution with an organic solvent to recover the oxime. For example, cyclohexane may be used. The extract can be used as the solvent for extraction of the oxime from the aqueous reduction liquor as described in the process of Bernard H. Nicolaisen and O'Hara application Serial No. 448,088. Alternatively the extract may be returned to the neutralization vessel. In addition, the separated salt solution may be mixed with the purge or aqueous reduction liquor of the process of that application and both of these materials may be extracted simultaneously before discarding the aqueous portion.

The process of the present invention may be effected continuously or batchwise and is further described in the following specific examples which are not to be considered limiting.

Example I

A benzene extract of an aqueous hydrogen sulfide reduction of nitrocyclohexane to cyclohexanone oxime was stirred with an excess of 10% aqueous sulfuric acid at room temperature. The aqueous layer was separated and ammonia gas was introduced to raise the pH to 2. About 87% of the recoverable oxime separated as a solid which was filtered out. After air-drying, it was 95% pure. Nearly all of the oxime remaining in the aqueous solution was precipitated by adding further quantities of ammonia gas to the filtrate until it had a pH of 4.

Example II

About 250 parts by weight of a benzene extract of an aqueous hydrogen sulfide reduction of nitrocyclohexane to cyclohexanone oxime was added to 166 parts of 10% sulfuric acid with stirring. The separated aqueous acid solution of oxime neutralized by the addition, at 14° to 24° C., of 20 parts of 27% aqueous ammonia, resulting in a slurry of precipitated oxime in an aqueous liquor having a pH of 3. The oxime, separated by filtration and air dried was suitable for rearrangement to caprolactam.

Example III

A charge of 223 parts by weight of a cyclohexane extract of an aqueous hydrogen sulfide reduction of nitrocyclohexane to cyclohexanone oxime was stirred with 114 parts of water and 21.3 parts of 95% sulfuric acid. The separated aqueous layer, containing the oxime as sulfate was neutralized to a pH of 3 by the addition of 29 parts of 23% aqueous ammonia at 20° to 30° C. The precipitated oxime was removed by filtration and air-dried. It amounted to 15.5 parts by weight and was suitable for rearrangement to caprolactam.

We claim:

1. A method for recovering cyclohexanone oxime from solution in a water-immiscible organic hydrocarbon solvent, said solution containing contaminants, which comprises contacting the said solution with a dilute, aqueous, strong mineral acid to form a water-soluble salt of the oxime, separating the resulting aqueous phase containing the water-soluble oxime salt, partly neutralizing the separated aqueous phase with ammonia to a pH of about 2 to 4 to effect separation of the oxime from the aqueous phase and recovering the separated oxime, said oxime being substantially free of said contaminants.

2. A method according to claim 1 in which said organic solvent is benzene.

3. A method according to claim 1 in which said organic solvent is cyclohexane.

4. A method for the separate recovery of cyclohexanone oxime and nitrocyclohexane from solution in a water-immiscible organic hydrocarbon solvent, said solution containing contaminants, which comprises contacting the said solution with a dilute, aqueous, strong, mineral acid to form a water-soluble salt of the oxime, separating the resulting aqueous phase containing the water-soluble oxime salt from the non-aqueous phase containing nitrocyclohexane, recovering nitrocyclohexane from the non-aqueous phase and partially neutralizing the separated aqueous phase with ammonia to a pH of about 2 to 4 to effect separation of the oxime from the aqueous phase and recovering the separated oxime, said oxime being substantially free of said contaminants.

5. A cyclic and continuous method for separately recovering cyclohexanone oxime and nitrocyclohexane from solution in a water-immiscible organic hydrocarbon solvent, said solution containing contaminants, which comprises contacting the said solution with a dilute, aqueous, strong, mineral acid to form a water-soluble salt of the oxime, separating the resulting aqueous phase containing the water-soluble oxime salt from the non-aqueous phase containing nitrocyclohexane, recovering nitrocyclohexane by caustic extraction from the non-aqueous phase, recycling the caustic extract to a reduction operation effective to form additional cyclohexanone oxime and recycling the organic solvent to form additional quantities of the solution of cyclohexanone oxime, neutralizing the separated aqueous phase containing the water-soluble oxime salt by the addition of ammonia to a pH of about 2 to 4 to effect separation of the oxime from the aqueous phase and recovering the separated oxime, said oxime being substantially free of said contaminants.

6. A method for recovering cyclohexanone oxime from a solution in a water-immiscible organic hydrocarbon solvent extract, said solution containing contaminants, of an aqueous sulfide reduction of nitrocyclohexane to cyclohexanone oxime which comprises contacting the extract with a dilute, aqueous, strong mineral acid to form a water-soluble salt of the oxime, separating the resulting aqueous phase containing the water-soluble salt, partially neutralizing the separated aqueous phase with ammonia to a pH of about 2 to 4 to effect separation of the oxime from the aqueous phase and recovering the separated oxime, said oxime being substantially free of said contaminants.

7. A method according to claim 6 in which said organic solvent is benzene.

8. A method according to claim 6 in which said organic solvent is cyclohexane.

9. A method according to claim 6 in which said acid is sulfuric acid.

10. A method according to claim 6 in which said sulfide is hydrogen sulfide.

References Cited in the file of this patent

UNITED STATES PATENTS

| 2,249,177 | Schlack | July 15, 1941 |
| 2,696,505 | Welz | Dec. 7, 1954 |

FOREIGN PATENTS

| 871,031 | France | Apr. 3, 1942 |
| 499,518 | Belgium | Dec. 15, 1950 |